(12) United States Patent
Ferris et al.

(10) Patent No.: US 8,904,005 B2
(45) Date of Patent: Dec. 2, 2014

(54) INDENTIFYING SERVICE DEPENDENCIES IN A CLOUD DEPLOYMENT

(75) Inventors: James Michael Ferris, Cary, NC (US); Gerry Edwards Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 444 days.

(21) Appl. No.: 12/952,857

(22) Filed: Nov. 23, 2010

(65) Prior Publication Data

US 2012/0131193 A1 May 24, 2012

(51) Int. Cl.
*G06F 15/173* (2006.01)
*G06F 9/50* (2006.01)

(52) U.S. Cl.
CPC .................... *G06F 9/5072* (2013.01)
USPC .......................... 709/226; 709/203

(58) Field of Classification Search
USPC .......................... 709/203, 223, 226
See application file for complete search history.

(56) References Cited

U.S. PATENT DOCUMENTS

| | | | |
|---|---|---|---|
| 6,463,457 B1 | 10/2002 | Armentrout et al. |
| 7,313,796 B2 | 12/2007 | Hamilton et al. |
| 7,439,937 B2 | 10/2008 | Ben-Shachar et al. |
| 7,529,785 B1 | 5/2009 | Spertus et al. |
| 7,546,462 B2 | 6/2009 | Upton |
| 7,596,620 B1 | 9/2009 | Colton et al. |
| 2001/0039497 A1 | 11/2001 | Hubbard |
| 2002/0069276 A1 | 6/2002 | Hino et al. |
| 2002/0165819 A1 | 11/2002 | McKnight et al. |
| 2003/0037258 A1 | 2/2003 | Koren |
| 2003/0110252 A1 | 6/2003 | Yang-Huffman |
| 2003/0135609 A1 | 7/2003 | Carlson et al. |
| 2004/0162902 A1 | 8/2004 | Davis |
| 2004/0210591 A1 | 10/2004 | Hirschfeld et al. |
| 2004/0210627 A1 | 10/2004 | Kroening |
| 2004/0268347 A1 | 12/2004 | Knauerhase et al. |
| 2005/0131898 A1 | 6/2005 | Fatula |
| 2005/0144060 A1 | 6/2005 | Chen et al. |
| 2005/0182727 A1 | 8/2005 | Robert et al. |
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |

(Continued)

OTHER PUBLICATIONS

Morgan, "Systems and Methods for Detecting Resource Consumption Events Over Sliding Intervals in Cloud-Based Network", U.S. Appl. No. 13/149,235, filed May 31, 2011.

(Continued)

*Primary Examiner* — El Hadji Sall
(74) *Attorney, Agent, or Firm* — Lowenstein Sandler LLP

(57) ABSTRACT

Embodiments relate to systems and methods for identifying service dependencies in a cloud deployment. In particular, a deployment module can receive usage data from a host cloud comprising data related to end user operation of a set of services in the host cloud as well as service dependencies among the set of services. In embodiments, the deployment module can determine candidate target clouds in which to deploy the set of services. Further, in embodiments, the deployment module can determine whether the candidate target clouds have a capacity to support the set of services, as well as whether services within the candidate target clouds are compatible based on the service dependencies.

20 Claims, 6 Drawing Sheets

(56) References Cited

U.S. PATENT DOCUMENTS

| | | |
|---|---|---|
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris et al. |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0217850 A1 | 8/2010 | Ferris |
| 2010/0217864 A1 | 8/2010 | Ferris |
| 2010/0217865 A1 | 8/2010 | Ferris |
| 2010/0220622 A1 | 9/2010 | Wei |
| 2010/0299366 A1 | 11/2010 | Stienhans et al. |
| 2010/0306354 A1 | 12/2010 | DeHaan et al. |
| 2010/0306377 A1 | 12/2010 | DeHaan et al. |
| 2010/0306379 A1 | 12/2010 | Ferris |
| 2010/0306566 A1 | 12/2010 | DeHaan et al. |
| 2010/0306765 A1 | 12/2010 | DeHaan |
| 2010/0306767 A1 | 12/2010 | DeHaan |
| 2011/0016214 A1 | 1/2011 | Jackson |
| 2011/0055034 A1 | 3/2011 | Ferris et al. |
| 2011/0055377 A1 | 3/2011 | DeHaan |
| 2011/0055378 A1 | 3/2011 | Ferris et al. |
| 2011/0055396 A1 | 3/2011 | DeHaan |
| 2011/0055398 A1 | 3/2011 | DeHaan et al. |
| 2011/0055588 A1 | 3/2011 | DeHaan |
| 2011/0131335 A1 | 6/2011 | Spaltro et al. |
| 2011/0231552 A1* | 9/2011 | Carter et al. ............ 709/226 |
| 2011/0246635 A1* | 10/2011 | Phukan ............ 709/223 |
| 2011/0289198 A1* | 11/2011 | Isaacson et al. ............ 709/221 |
| 2013/0058634 A1* | 3/2013 | Martinez Reol et al. ..... 386/353 |

OTHER PUBLICATIONS

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

Morgan, "Systems and Methods for Tracking Cloud Installation Information Using Cloud-Aware Kernel of Operating System", U.S. Appl. No. 13/149,750, filed May 31, 2011.

Morgan, "Systems and Methods for Introspective Application Reporting to Facilitate Virtual Machine Movement Between Cloud Hosts", U.S. Appl. No. 13/118,009, filed May 27, 2011.

Morgan, "Systems and Methods for Self-Moving Operating System installation in Cloud-Based Network", U.S. Appl. No. 13/149,877, filed May 31, 2011.

"rBuilder and the rPath Appliance Platform", 2007 rPath, Inc., www.rpath.com, 3 pgs.

White Paper—"rPath Versus Other Software Appliance Approaches", Mar. 2008, rPath, Inc., www.rpath.com, 9 pgs.

White Paper—"Best Practices for Building Virtual Appliances", 2008 rPath, Inc., www.rpath.com, 6 pgs.

DeHann et al., "Systems and Methods for Secure Distributed Storage", U.S. Appl. No. 12/610,081, filed Oct. 30, 2009.

Ferris et al., "Methods and Systems for Monitoring Cloud Computing Environments" U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris et al, "Methods and Systems for Verifying Software License Compliance in Cloud Computing Environments", U.S. Appl. No. 12/627,643, filed Nov. 30, 2009.

Ferris et al, "Systems and Methods for Service Aggregation Using Graduated Service Levels in Cloud Network", U.S. Appl. No. 12/628,112, filed Nov. 30, 2009.

Ferris et al, "Methods and Systems for Generating a Software License Knowledge Base for Verifying Software License Compliance in Cloud Computing Environments", U.S. Appl. No. 12/628,156, filed Nov. 30, 2009.

Ferris et al, "Methods and Systems for Converting Standard Software Licenses for Use in Cloud Computing Environments", U.S. Appl. No. 12/714,099, filed Feb. 26, 2010.

Ferris et al, "Systems and Methods for Managing a Software Subscription in a Cloud Network", U.S. Appl. No. 12/714,096, filed Feb. 26, 2010.

Ferris et al., "Methods and Systems for Providing Deployment Architectures in Cloud Computing Environments", U.S. Appl. No. 12/714,427, filed Feb. 26, 2010.

Ferris et al., "Methods and Systems for Matching Resource Requests with Cloud Computing Environments", U.S. Appl. No. 12/714,113, filed Feb. 26, 2010.

Ferris et al., "Systems and Methods for Generating Cross-Cloud Computing Appliances", U.S. Appl. No. 12/714,315, filed Feb. 26, 2010.

Ferris et al., "Systems and Methods for Cloud-Based Brokerage Exchange of Software Entitlements", U.S. Appl. No. 12/714,302, filed Feb. 26, 2010.

Ferris et al., "Methods and Systems for Offering Additional License Terms During Conversion of Standard Software Licenses for Use in Cloud Environments", U.S. Appl. No. 12/714,065, filed Feb. 26, 2010.

(56) References Cited

OTHER PUBLICATIONS

Ferris et al., "Systems and Methods for or a Usage Manager for Cross-Cloud Appliances", U.S. Appl. No. 12/714,334, filed Feb. 26, 2010.

Ferris et al., "Systems and Methods for Delivery of User-Controlled Resources in Cloud Environments Via a Resource Specification Language Wrapper", U.S. Appl. No. 12/790,294, filed May 28, 2010.

Ferris et al., "Systems and Methods for Managing Multi-Level Service Level Agreements in Cloud-Based Networks", U.S. Appl. No 12/789,660, filed May 28, 2010.

Ferris et al., "Methods and Systems for Generating Cross-Mapping of Vendor Software in a Cloud Computing Environment", U.S. Appl. No. 12/790,527, filed May 28, 2010.

Ferris et al., "Methods and Systems for Cloud Deployment Analysis Featuring Relative Cloud Resource Importance", U.S. Appl. No. 12/790,366, filed May 28, 2010.

Ferris et al., "Systems and Methods for Generating Customized Build Options for Cloud Deployment Matching Usage Profile Against Cloud Infrastructure Options", U.S. Appl. No. 12/789,701, flied May 28, 2010.

Ferris et al., "Systems and Methods for Exporting Usage History Data as Input to a Management Platform of a Target Cloud-Based Network", U.S. Appl. No. 12/790,415, filed May 28, 2010.

Ferris et al., "Systems and Methods for Cross-Vendor Mapping Service in Cloud Networks", U.S. Appl. No. 12/790,162, filed May 28, 2010.

Ferris et al., "Systems and Methods for Cross-Cloud Vendor Mapping Service in a Dynamic Cloud Marketplace", U.S. Appl. No. 12/790,229, filed May 28, 2010.

Ferris et al., "Systems and Methods for Aggregate Monitoring of Utilization Data for Vendor Products in Cloud Networks", U.S. Appl. No. 12/790,039, filed May 28, 2010.

Ferris et al., "Systems and Methods for Combinatorial Optimization of Multiple Resources Across a Set of Cloud-Based Networks", U.S. Appl. No. 12/953,718, filed Nov. 24, 2010.

Ferris et al., "Systems and Methods for Matching a Usage History to a New Cloud" U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "System and Methods for Migrating Subscribed Services from a Set of Clouds to a Second Set of Clouds", U.S. Appl. No. 12/957,281, filed Nov. 30, 2001.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, filed Nov. 23, 2010.

Ferris et al. "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

Morgan, "Systems and Methods for Generating Optimized Resource Consumption Periods for Multiple Users on Combined Basis", U.S. Appl. No. 13/037,359, filed Mar. 1, 2011.

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

* cited by examiner

_US 8,904,005 B2_

IDENTIFYING SERVICE DEPENDENCIES IN A CLOUD DEPLOYMENT

FIELD

The present teachings relate to systems and methods for identifying service dependencies in a cloud deployment, and more particularly to platforms and techniques for ensuring a capacity of one or more target clouds to deploy a set of services while preserving any necessary dependencies.

BACKGROUND OF RELATED ART

Cloud computing environments utilize shared resources, software, and information that can be provided for use by end users. For example, a service level agreement (SLA) can be entered into between a vendor, such as an independent software vendor (ISV), and a cloud network provider whereby the cloud network provider agrees to commit an amount of resources associated with virtual machines in the cloud network for use by end users during operation of software products and applications of the vendor. In return, the cloud network provider can charge the vendor a specified rate in proportion to the amount of committed resources. The cloud network provider provides or maintains an amount of resources in the cloud network, such as server uptime, persistent storage, software application instantiation, network performance, cloud storage, support response time, and other elements.

The end users can subscribe to services offered by the cloud provider or others, and the end users can use the cloud resources when operating or otherwise using the services. A set of services deployed in one or more clouds can have dependencies whereby, for example, an initialization of one service depends on an output from another service. In a cloud migration or deployment, it can be the case that a target cloud does not have the capacity to successfully operate one or more desired services. Further, it can be the case that the resources and services of target cloud do not have the compatibility to successfully operate the one or more desired services, based on the dependencies or inter-dependencies of the services. For example, the resources and services of the target cloud may not be able to support a language that is required by the one or more desired services.

Therefore, it may be desirable to provide systems and methods for identifying service dependencies in a cloud deployment. In particular, it may be desirable to ensure a capacity and compatibility of one or more target clouds with a set of services and any necessary dependencies.

DESCRIPTION OF EMBODIMENTS

Figure 1:
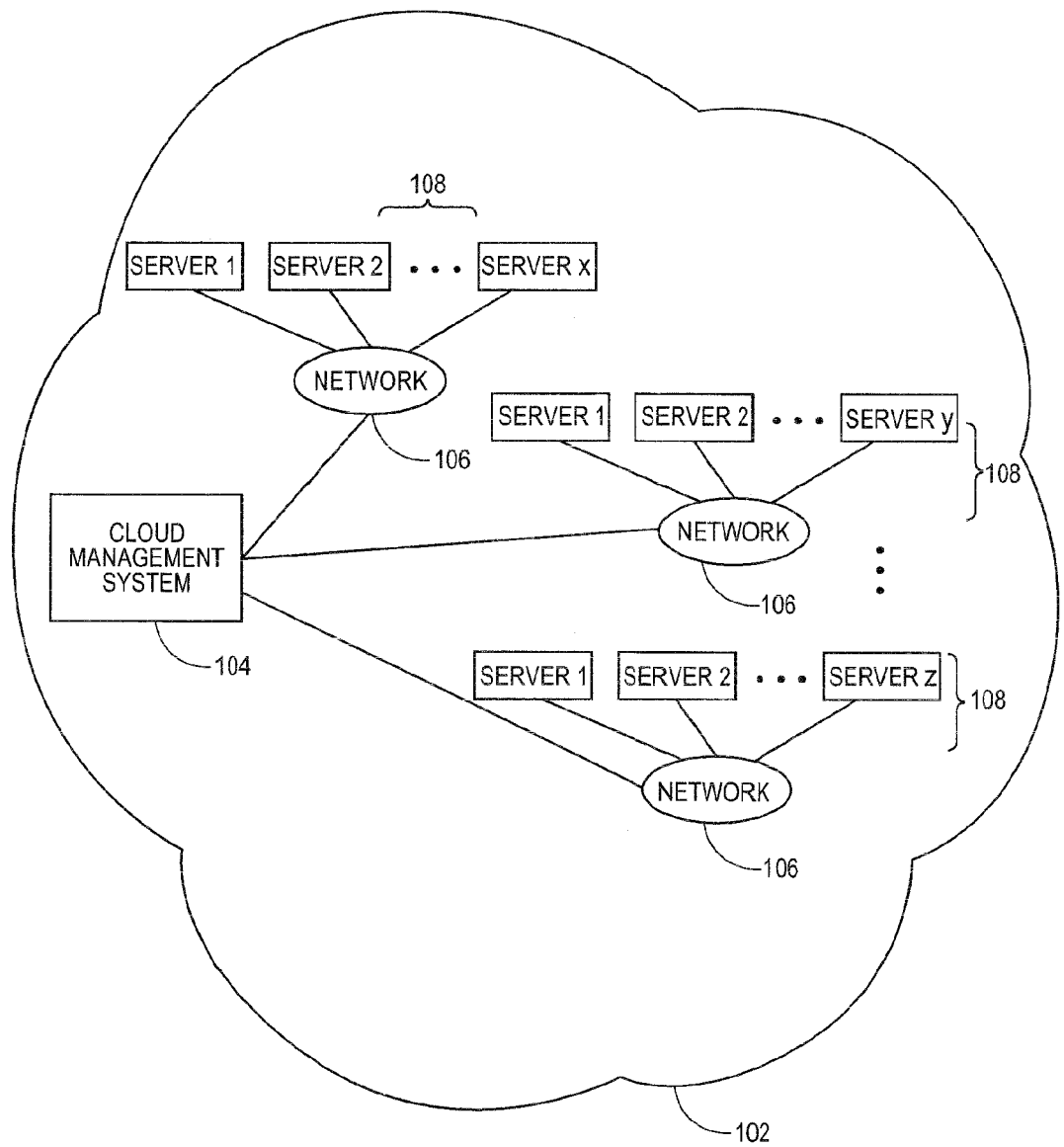
FIG. 1 illustrates an overall cloud system architecture in which various embodiments of the present teachings can be practiced.

Embodiments of the present teachings relate to systems and methods for identifying service dependencies in a cloud deployment. In particular, embodiments relate to ensuring a capability of one or more target clouds to deploy a set of services while preserving any necessary dependencies. The target cloud(s) can have a specified amount of resources to be utilized by, for example, end users. For example, the resources of the target cloud(s) can be deployed as a Software as a Service (SaaS). An administrator of a host cloud can desire to migrate or re-deploy a set of services from the host cloud to the target cloud(s). In embodiments, the set of services can comprise dependencies whereby the target cloud(s) can be required to have necessary resources to support the set of services.

According to embodiments, a dependency module or other logic can receive a usage history associated with a host cloud, where the usage history can indicate a set of services subscribed to by a user as well as a service dependency within the set of services. The dependency module can detect a target cloud(s) that is a candidate in which to deploy the set of services. According to embodiments, the dependency module can determine whether the target cloud(s) comprises a capacity to deploy the set of services as well as whether the resources of the target cloud(s) are compatible with the service dependency. In other embodiments, the set of services can be deployed in the target cloud(s).

In embodiments, the dependency module can be configured to provide relevant data or information to an administrator of a cloud so that the administrator can determine an implementation plan for a set of services. For example, the administrator may wish to use the usage history or other data to examine or generate a business model based on an hourly rate, consumption rate, or other metrics, and determine a potential candidate cloud based on any relevant business models.

Embodiments as described herein can be implemented in or supported by a cloud network architecture. As used herein, a "cloud" can refer to a cloud-based network comprising a collection of resources that can be invoked to instantiate a virtual machine, process, or other resource for a limited or defined duration. As used herein, an "end user" can refer to a person, customer, subscriber, corporation, organization, or other entity accessing files and/or devices storing the files in the cloud. In embodiments, the end user can operate or manage computer software or hardware that can access files and/ or devices storing the files in the cloud-based network. Further, as used herein, an "administrator" of a cloud can refer to a person, owner, corporation, organization, or other entity having authoritative power to initialize, oversee, or otherwise manage the operation of a cloud.

As used herein, the "resources" of a cloud can refer to software or hardware such as, for example, applications, programs, servers, device drivers, storage such as hard drives, virtual memory, databases, random access memory (RAM) and other memory, processors, multimedia cards, and the like, in the cloud. The resources can be accessed by users or by software or applications independent from or associated with resources of the cloud. In embodiments, vendors such as ISVs can supply software resources for use with other resources in a cloud. Resources of the cloud can further refer to any communications resources, such as ports or channels provided to a virtual machine or other machine or process in the cloud. Resources can likewise include services, such as Web-based services deployed in the cloud, for example security or identity management services and/or other resources.

As used herein, a "service" can be a general term that can refer to any service capable of being executed in or otherwise supported by a cloud. For example, a service can be any type of identity management service, firewall or other security service, messaging service, data storage or backup service, file maintenance service, or any other service that can be made available to an end user in the cloud environment. It should be appreciated that other services associated with or otherwise supported by a cloud are envisioned. Further, as used herein, a "service dependency" can be a general term that can refer to any type of dependency in, between, or among one or more services. For example, a service dependency can specify that an output from one service must be used as an input for another service. For further example, a service dependency can specify that one or more services must use a specified data format in operating the one or more services. It should be appreciated that other service dependencies in, between, or among services are envisioned.

FIG. 1 illustrates an overall cloud system architecture in which various embodiments of the present teachings can be practiced. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via network 106 such as the Internet or other public or private network with all sets of resource servers to manage the cloud 102 and its operation. To instantiate a new set of virtual machines, a user can transmit an instantiation request to the cloud management system 104 for the particular type of virtual machine that the user desires to invoke for its intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user desires to be available to each instance of the virtual machine or other resource. In embodiments, the requesting user can for instance specify a service level agreement (SLA) acceptable for their purposes. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more of the set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours.

The cloud management system 104 can select groups of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet protocol (IP) addresses or other addresses. The cloud management system 104 can register the finalized group of servers in the set of resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in the set of resource servers 108. The cloud management system 104 can receive a confirmation message back from each participating server in the set of resource servers 108 indicating a status regarding the provisioning of their respective resources. Various sets of resource servers may confirm, for example, the availability of a dedicated amount of processor cycles, amounts of electronic memory, communications bandwidth, or applications or other software prepared to be served.

Figure 2:
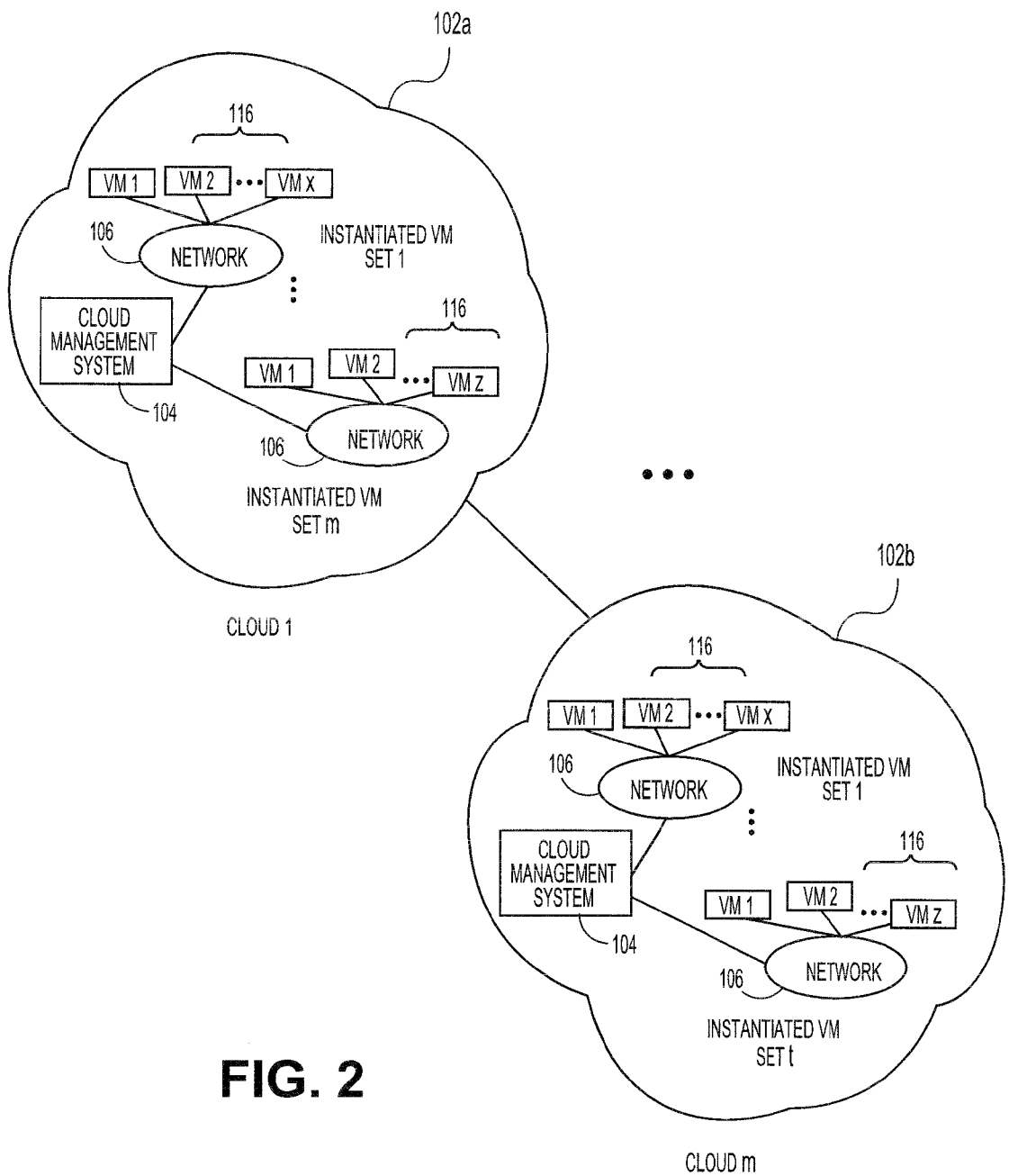
FIG. 2 illustrates an overall cloud system architecture including multiple cloud arrangements in which various embodiments of the present teachings can be practiced in another regard, according to various embodiments.

As shown for example in FIG. 2, the cloud management system 104 can then instantiate one or more than one set of virtual machines 116, or other processes based on the resources supplied by the registered set of resource servers 108 (shown in FIG. 1). In embodiments, the cloud management system 104 can instantiate a given number, for example, 10, 500, 1000, or other numbers of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track, and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the network 106 via a browser interface, or other interface or mechanism.

Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102*a*, 102*b* or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102*a*, 102*b*. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated machines 116, processes, or other resources can be scaled up or down immediately or within a short period of time on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or almost constant, since instances are assembled from abstracted resources that can be selected and maintained from diverse sources based on uniform specifications.

In terms of network management of the set of virtual machines 116 that have been successfully configured and instantiated, the cloud management system 104 can perform various network management tasks including security, maintenance, and metering for billing or subscription purposes. The cloud management system 104 of a given cloud 102*a*, 102*b* can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping, or successive times. The cloud management system 104 can, in such implementations, build, launch, and manage multiple sets of virtual machines based on the same or different underlying set of resource servers 108, with populations of different instantiated virtual machines 116 such as may be requested by different users. The cloud management system 104 can institute and enforce security protocols in a cloud 102*a*, 102*b* hosting multiple sets of virtual machines. Each of the individual sets of virtual machines can be hosted in a respective partition or sub-cloud of the resources of the main cloud 102a, 102b. The cloud management system 104 of a cloud can for example deploy services specific to isolated or defined sub-clouds, or isolate individual workloads/processes within the cloud to a specific sub-cloud. The subdivision of the cloud 102a, 102b into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102a can also interact with a set of instantiated virtual machines or processes generated in a second, third or further cloud 102b. Further, the cloud management system 104 of the first cloud 102a can interface with the cloud management system 104 of the second cloud 102b, to coordinate those domains and operate the clouds and/or virtual machines or processes on a combined basis. The cloud management system 104 of a given cloud 102a, 102b can track and manage individual virtual machines or other resources instantiated in that cloud, as well as the set of instantiated virtual machines or other resources in other clouds.

Figure 3:
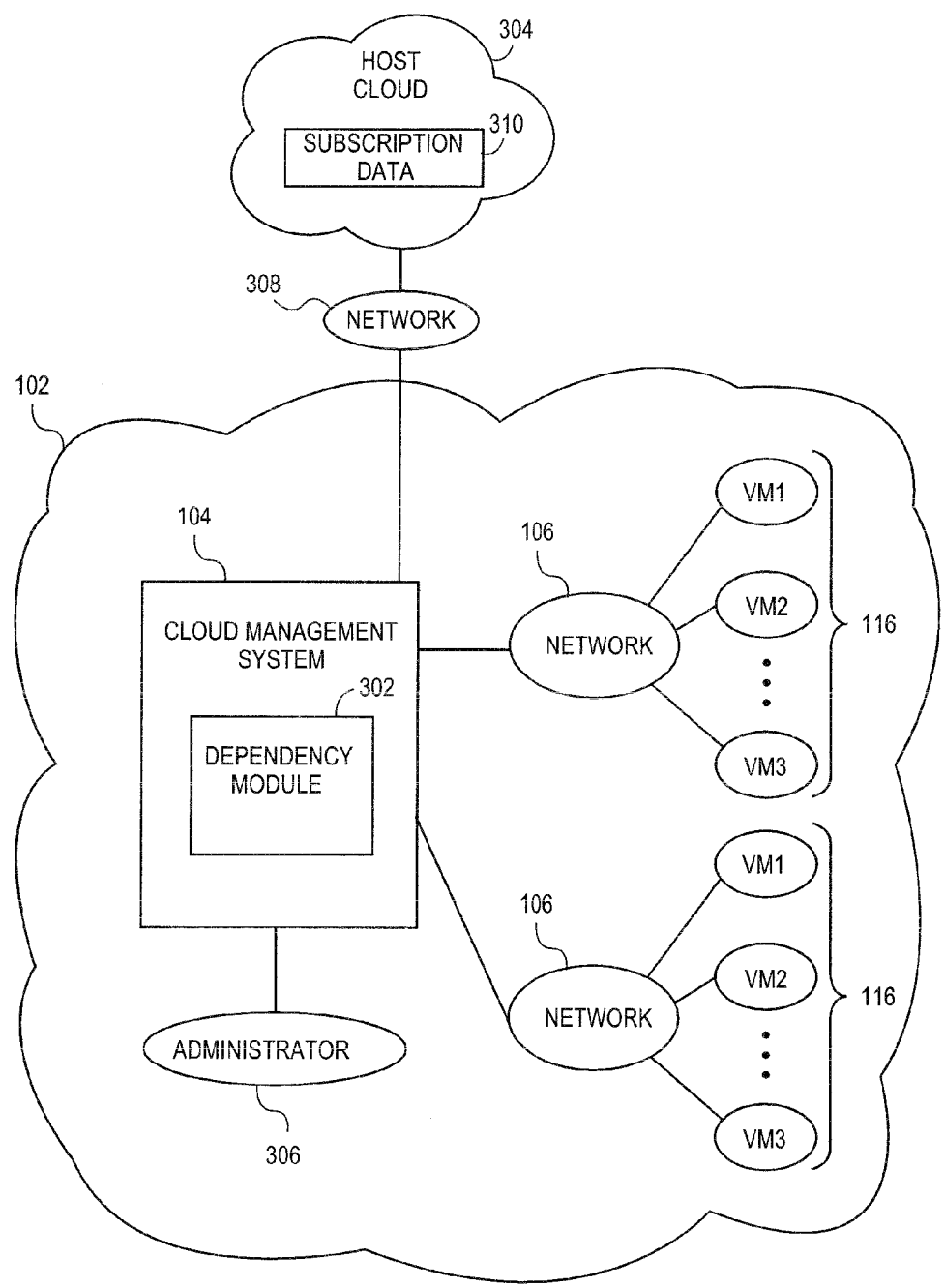
FIG. 3 illustrates an exemplary network configuration that can be used in systems and methods for identifying service dependencies in a cloud deployment, according to various embodiments.

FIG. 3 illustrates an exemplary network configuration that can be used in systems and methods for identifying service dependencies in a cloud deployment. In embodiments as shown, the cloud management system 104 of a target cloud 102 can comprise a dependency module 302 configured to interface with an administrator 306 and with the set of instantiated virtual machines 116 via the one or more networks 106. The dependency module 302 can further be configured to interface with a host cloud 304 via a network 308, or the network 106. It should be appreciated that the dependency module 302 can be implemented on other hardware and/or software components or can be configured to interface with the other components and entities described herein.

Further, it should be appreciated that the dependency module 302 can be configured to interface with additional existing host clouds 304 or target clouds 102 (not shown in figures) and associated resources, such as virtual machines, of the additional host clouds 304 or target clouds 102. Further still, it should be clear that although FIG. 3 depicts the dependency module 302 in association with the cloud management system 104 of the target cloud 102, in certain embodiments the dependency module 302 can instead be associated with the host cloud 304, as well as with multiple host clouds 304. In such embodiments, the dependency module 302 can receive information about the capability, compatibility, and other service data of the target cloud 102 and analyze this data with respect to at least subscription data 310 of local users for potential migration of the local users to the target cloud 102.

In embodiments, the administrator 306 can be any person, owner, corporation, organization, or other entity having authoritative power to initialize, oversee, or otherwise manage the operation of the target cloud 102. In embodiments, the administrator 306 can manage the delivery or provisioning of software applications, or other software, hardware, or other products or services, such as products and services of one or more ISVs (not shown in figures), to end users accessing the target cloud 102. In embodiments, the end users can access the set of instantiated virtual machines 116 located in the target cloud 102. It should be appreciated that the administrator 306 can enter into one or more service agreements with vendors or other entities to provide resources to end users in one or multiple clouds, and/or across multiple products and/or product lines. It should further be appreciated that the administrator 306 can oversee multiple target or candidate clouds, and can communicate and contact other respective administrators of the multiple target or candidate clouds.

The dependency module 302 can receive the subscription data 310 from the host cloud 304 via the network 308. In embodiments, the subscription data 310 can comprise respective end user data regarding utilization of subscribed services within the host cloud 304, along with dependency information for the utilization. In embodiments, the subscription data 310 can comprise any captured hardware, storage, software, and other resource consumption information and patterns for users of the host cloud 304, on an individual and/or group basis. In embodiments, the subscription data 310 can comprise any data relating to the operation of identity management services, firewall or other security services, messaging services, data storage services, file maintenance services, or other services made available to the end users in the host cloud 304. For example, the subscription data 310 can detail an amount of data transferred by users over networks associated with the host cloud 304. For further example, the subscription data 310 can comprise messaging histories of the users of the host cloud 304.

In embodiments, the dependency module 302 can statically or dynamically analyze program code and/or executable files associated with the host cloud 304 to determine information related to the services. In further embodiments, the dependency module 302 can statically or dynamically analyze any meta-data or services available specifically to applications in the host cloud 304 to determine information related to the services. It should be appreciated that other techniques used to determine services of the host cloud 304 are envisioned.

In embodiments, the dependency information of the subscription data 310 can detail any dependencies among the subscribed services within the host cloud 304. For example, the dependency information can indicate that one service depends on an output or other usage of another service. For further example, the dependency information can indicate that a security service depends on an identity management service, so that different levels of access privileges to data may depend on the authenticated identity of a user or users. In particular, the security service can require that the user be authenticated before allowing the user to access the data stored by the security service. Further, for example, the dependency information can specify a data format compatibility requirement among the subscribed services. Still further, for example, the dependency information can indicate that the services require resources that can support the English language. It should be appreciated that any dependency information among a set of subscribed services is envisioned.

In some embodiments, the dependency module 302 can simulate, model, or otherwise analyze the subscription data 310 with respect to resources within the target cloud 102 and other clouds (not shown in figures), such as on the set of instantiated virtual machines 116. In other embodiments, the dependency module 302 can determine the capacity within the target cloud 102 and other clouds to initialize, execute, or otherwise support any of the services in subscription data 310. For example, the dependency module 302 can detect that the subscription data 310 comprises data related to a messaging service, and can determine that resources in the target cloud 102 have an infrastructure in place to support the messaging service.

In embodiments, the dependency module 302 can determine that the target cloud 102 or other clouds have an ability to support a type of service, but may or may have not a capacity to support the service with a similar amount of processing power, network bandwidth, end users, or other metrics as indicated in the subscription data 310. For example, the subscription data 310 can specify that, on average, 2,000 end users access a firewall service every day, but the dependency module 302 can determine that the resources of the target cloud 102 can only support, on average, 1,000 end users accessing a similar firewall service every day. For further example, the subscription data 310 can specify that, on average, end users utilize 100 GB of storage per month in operating a data storage service, and the dependency module 302 can determine that the resources of the target cloud 102 can support, on average, end users utilizing 150 GB of storage per month in operating a similar firewall service.

In other embodiments, the dependency module 302 can determine a service capacity spread out over multiple clouds. For example, if the subscription data 310 indicates both a messaging service and a data storage service subscribed to by end users, the dependency module 302 can locate other clouds, in addition to the target cloud 102 that, in combination, have a capacity to support both the messaging and data storage services.

In embodiments, the capacity analysis can yield a determination as to whether the target cloud 102 and/or other clouds offer resources sufficient to support the services as specified in the subscription data 310. It should be appreciated that in other embodiments, dependency module 302 can use other methods to analyze the subscription data 310 with respect to the feasibility and capacity of hosting a similar quantity and type of services on the target cloud 102 and other clouds.

In embodiments, the dependency module 302 can determine, simulate, model, or otherwise analyze whether resources of the target cloud 102 and/or other clouds are compatible with the dependency information of the subscription data 310. In embodiments, this determination can be made based on the target cloud 102 and/or the other clouds having the necessary capacity to deploy the services as indicated in the subscription data 310. In other embodiments, the compatibility can be based on the services all located within one cloud or spread out over multiple clouds, for example the target cloud 102 and at least one other cloud.

For example, if the target cloud 102 has the capacity to deploy a messaging service and another cloud has the capacity to deploy a firewall service, the dependency module 302 can determine whether the two clouds operating the respective services and/or the respective services themselves are compatible. For example, the two clouds may not be compatible if one cloud supports a different data encryption policy than the other cloud. For further example, if the target cloud 102 has the capacity to deploy both an identity management service and a security service, and further if operation of the security service depends on a successful identity verification from the identity management service, the dependency module 302 can determine whether the respective services can be deployed in the target cloud 102 based on the dependency requirement. It should be appreciated that the dependency module 302 can determine compatibility among any service and among any combinations of a single cloud or multiple clouds.

As an output, the capacity and compatibility analyses can yield a determination as to whether the target cloud 102 and/or other clouds can support a deployment of the services identified in the subscription data 310. For example, the capacity and compatibility analyses can indicate that the target cloud 102 and/or other clouds have a capacity to support the services but cannot support the compatibility among any dependencies of the services, in which case the services cannot be deployed in the target cloud 102 and/or other clouds. For further example, the capacity and compatibility analyses can indicate that the target cloud 102 and/or other clouds have both a capacity to support the services as well as a compatibility to support the dependencies among the services, in which case the services can be deployed in the target cloud 102 and/or other clouds.

In embodiments, the dependency module 302 can deploy the services in the appropriate target cloud 102 and/or other clouds based on the support determination. In embodiments, an agreement such as an SLA can be entered into among one or more respective cloud providers, one or more vendors, and/or one or more end users. It should be appreciated that the services can be deployed on any resources of any cloud in any combination.

In embodiments, the dependency module 302 can notify the administrator 306 of the capability and compatibility of deploying the services in the target cloud 102 and/or other clouds. In embodiments, the administrator 306 can be notified of any of the results of the analyses performed by dependency module 302, in any way, and via any data communication. Further, in embodiments, the dependency module 302 can generate or provide a deployment recommendation or offer to an administrator, owner, or other user associated with the host cloud 304, or other clouds. Further, in embodiments, the offer can be directed to multiple administrators or entities associated with multiple clouds having the capability and compatibility to deploy the set of services. For example, if resources in exemplary clouds A and B can support a deployment of the services indicated in the subscription data 310 and already deployed on another cloud C, then one or more administrators of clouds A and B can be contacted in an effort to redeploy the services on clouds A and B. It should be appreciated that the administrator 306 or other entity can contact an administrator or a user associated with any existing clouds, in any way, with any type of information or offer.

Figure 4:
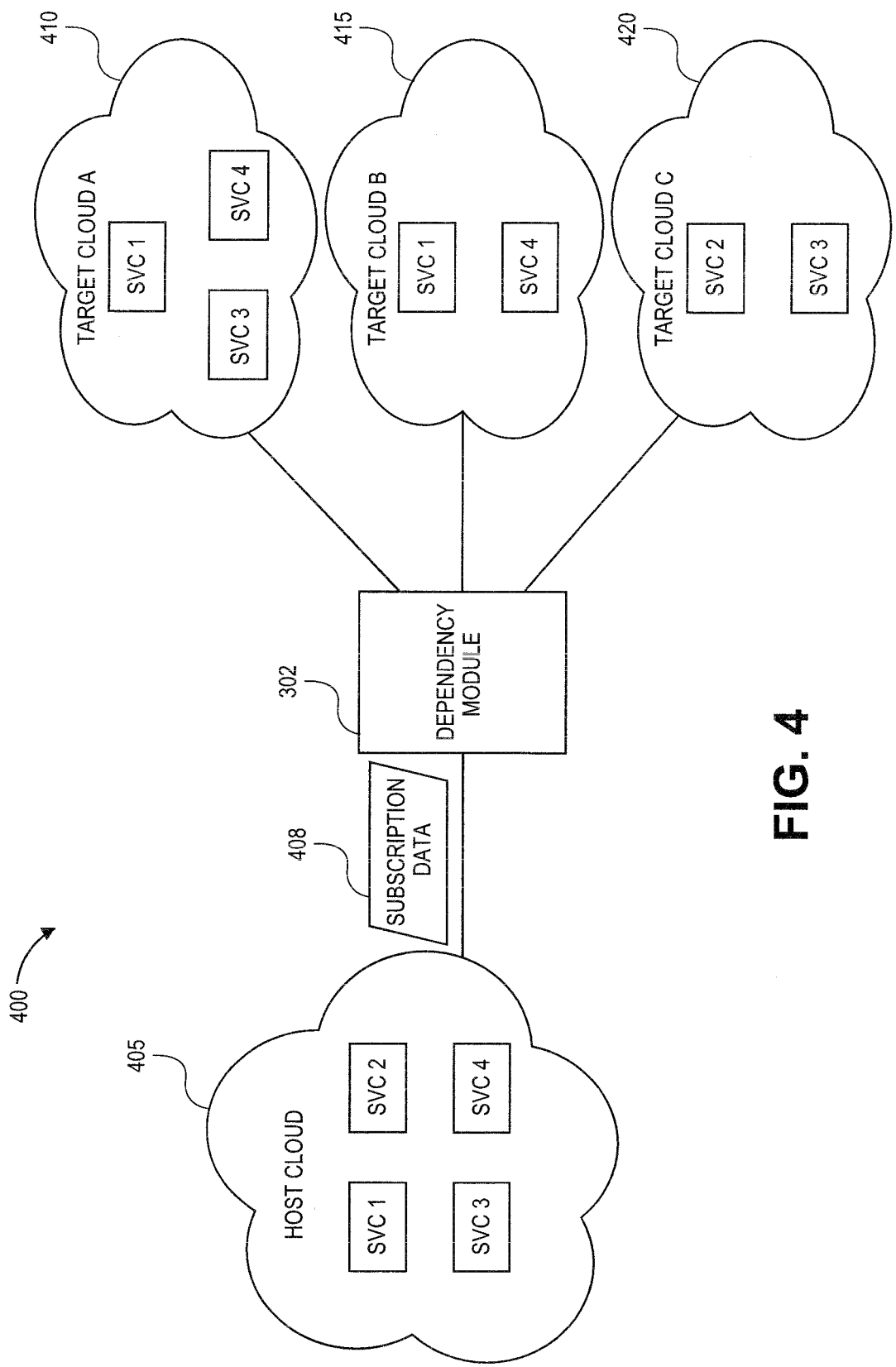
FIG. 4 illustrates an exemplary network diagram exploring dependency compatibility among a set of services, according to various embodiments.

FIG. 4 is an exemplary configuration 400 depicting a potential migration or deployment of services. It should be appreciated that the values, variables, and arrangements as shown in FIG. 4 are for illustration purposes and can be any value, variable, and arrangement. The configuration 400 comprises a host cloud 405, the dependency module 302, and three target clouds, namely, target cloud A 410, target cloud B 415, and target cloud C 420. As shown in FIG. 4, the host cloud 405 can support the operation of four services, namely, SVC 1, SVC 2, SVC, 3, and SVC 4. The dependency module 302 can be configured to receive subscription data 408 comprising end user data regarding utilization of the services within the host cloud 405, along with dependency information for the utilization.

In embodiments, each of the target clouds 410, 415, and 420 can have the capacity to support one or more services. For example, as shown in FIG. 4, target cloud A 410 has the capacity to support SVC 1, SVC 3, and SVC 4, target cloud B 415 has the capacity to support SVC 1 and SVC 4, and target cloud C 420 has the capacity to support SVC 2 and SVC 3. The dependency module 302 can determine which target cloud or combination of target clouds have the capacity to support the services of the host cloud 405. For example, target cloud A 410 in combination with target cloud C 420 has the capacity to support each of SVC 1, SVC 2, SVC 3, and SVC 4. For further example, target cloud A 410 in combination with target cloud B 415 does not have the capacity to support each of SVC 1, SVC 2, SVC 3, and SVC 4 because neither target cloud A 410 nor target cloud B 415 has the capacity to support SVC 2.

In embodiments, the dependency module 302 can examine the dependency information of the subscription data 408 from the host cloud 405 in combination with the respective capacities of the target clouds 410, 415, and 420 to determine which target cloud or combinations of target clouds have the compatibility to support a deployment of the services of the host cloud 405. For example, the dependency module 302 can determine that even though target cloud A 410 and target cloud C 420 have the capacity to support each of the services of the host cloud 405, the data formats used by the services of target cloud A 410 and target cloud C 420 are not compatible, and therefore the combination of target cloud A 410 and target cloud C 420 is unable to support the services of the host cloud 405.

For further example, the dependency module 302 can determine that even though target cloud B 415 and target cloud C 420 have the capacity to support each of the services of the host cloud 405, SVC 1 of target cloud B 415 is unable to communicate with SVC 2 of target cloud C, which can be required by the dependency information, and therefore the combination of target cloud B 415 and target cloud C 420 is unable to support the services of the host cloud 405. It should be appreciated that the dependency module 302 or other logic can employ any calculations, simulations, or models to examine capacity and compatibility issues in, between, or among any of the target clouds 410, 415, and 420.

Figure 5:
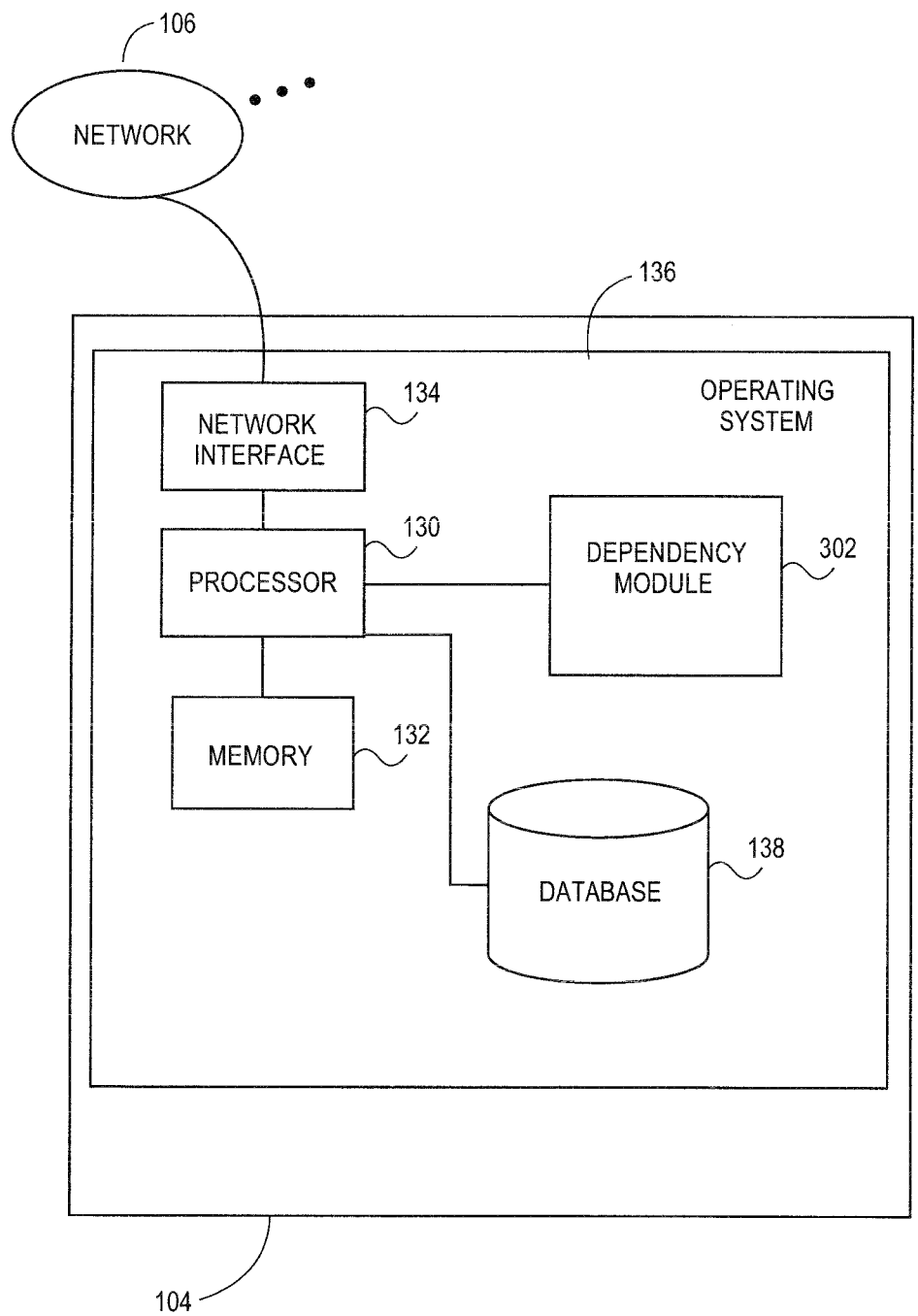
FIG. 5 illustrates an exemplary hardware configuration for a cloud-based management system, according to various embodiments.

FIG. 5 illustrates an exemplary diagram of hardware and other resources that can be incorporated in a cloud management system 104 configured to communicate with a set of instantiated virtual machines 116 (as shown in FIG. 2) via one or more networks 106, according to embodiments. In embodiments as shown, the cloud management system 104 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with one or more computer readable storage medium 138, such as hard drives, optical storage, databases, and the like. Processor 130 further communicates with network interface 134, such as an Ethernet or wireless data connection, which in turn communicates with one or more networks 106, such as the Internet or other public or private networks.

Processor 130 can also communicate with computer readable storage medium 138 and the optimization module 302, to execute control logic, identify usage histories for producing optimized cloud utilization in the cloud 102 as described herein, and control the operation of virtual machines and other resources in cloud 102. Other configurations of cloud management system 104, associated network connections, and other hardware and software resources are possible.

Figure 6:
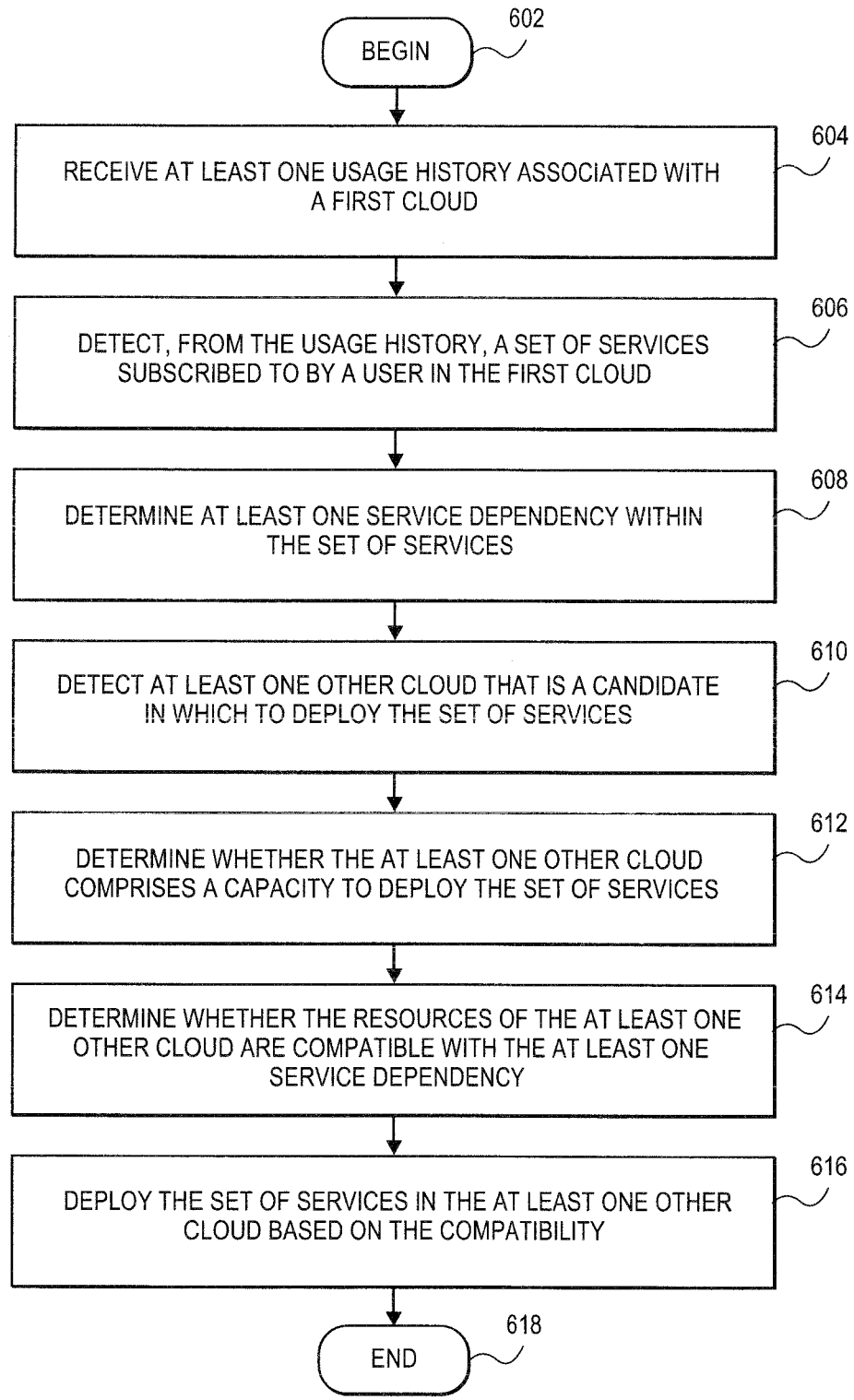
FIG. 6 illustrates a flowchart for identifying service dependencies in a cloud deployment, according to various embodiments.

FIG. 6 illustrates a flowchart for identifying service dependencies in a cloud deployment, according to various embodiments. In 602, processing can begin. In 604, at least one usage history associated with a first cloud can be received. In embodiments, the at least one usage history can correspond to resource usage by end users in the first cloud. For example, the resource usage can be any processing or consumption metrics related to services, hardware, storage, software, and other resources within the first cloud.

In 606, a set of services subscribed to by a user in the first cloud can be detected. In embodiments, the set of services can comprise any service used by the user within the first cloud such as, for example, identity management services, firewall or other security services, messaging services, data storage services, file management services, or other services made available to the user in the first cloud. In 608, at least one service dependency within the set of services can be determined. In embodiments, the at least one service dependency can indicate that one service depends on an output or other usage of another service. In other embodiments, the at least one service dependency can indicate a security or format dependency between or among services, or other types of dependencies, as discussed herein.

In 610, at least one other cloud that is a candidate in which to deploy the set of services can be detected. In embodiments, the at least one other cloud can be any existing cloud detected over any network in any way. In 612, it can determined whether the at least one other cloud comprises a capacity to deploy the set of services. In embodiments, the capacity can refer to an availability, on the at least one other cloud, of each of the services in the set of services. In other embodiments, the capacity can refer to the necessary resources on the at least other cloud to execute, facilitate, operate, or otherwise support each of the services in the set of services. In further embodiments, the availability and/or necessary resources can be spread out over multiple clouds.

In 614, it can be determined whether the resources of the at least one other cloud are compatible with the at least one service dependency. In embodiments, the compatibility can refer a security, format, or any other compatibility of the resources on the at least one other cloud to deploy the set of services based on the at least one service dependency. In 616, the set of services in the at least one other cloud can be deployed. In embodiments, the resources in the at least one other cloud can be configured to allow end users to use the deployed services via the at least one other cloud. In embodiments, a deployment recommendation or offer to employ use of the resources of the at least one other cloud can be provided to an administrator or entity associated with the at least one other cloud. In 618, processing can end.

The foregoing description is illustrative, and variations in configuration and implementation may occur to persons skilled in the art. For example, while embodiments have been described which operate using one dependency module 302 and associated cloud management system 104, in embodiments, one or more of dependency module 302 and associated cloud management system 104, and/or other servers, data stores, and/or other logic or resources can be used. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
    detecting a set of services subscribed in a host cloud;
    determining a service dependency within the set of services;
    detecting, by a processor, a target cloud in the host cloud as a candidate in which to deploy the set of services in view of utilization of the set of services within the host cloud; and
    determining, by the processor, whether a service within the target cloud is compatible with the service dependency.

2. The method of claim 1, further comprising deploying the set of services in the target cloud in response to the target cloud being capable of supporting the set of services.

3. The method of claim 1, further comprising:
generating a deployment recommendation for the set of services within the target cloud; and
providing the deployment recommendation to an administrator associated with the target cloud.

4. The method of claim 1, wherein the set of services comprises one or more of an identity management service, firewall service, security service, messaging service, data storage service, backup service, and file maintenance service.

5. The method of claim 1 further comprising:
determining that a first target cloud of the target cloud has a capacity to support at least one of the set of services;
determining that a second target cloud of the target cloud has a capacity to support a remainder of the set of services; and
determining whether the at least one of the set of services in the first target cloud and the remainder of the set of services in the second target cloud are compatible with the service dependency.

6. The method of claim 1 further comprising determining whether the target cloud comprises a capacity to deploy the set of services wherein the capacity comprises a processing power required to support the set of services.

7. The method of claim 1 further comprising determining whether the target cloud comprises a capacity to deploy the set of services wherein the capacity comprises a network bandwidth required to support the set of services.

8. The method of claim 1, further comprising notifying an administrator of the target cloud in response to the target cloud being capable of supporting the set of services.

9. A system comprising:
a memory;
a processor coupled to the memory to:
detect a set of services subscribed in a host cloud;
determine a service dependency within the set of services;
detect a target cloud in the host cloud as a candidate in which to deploy the set of services in view of utilization of the set of services within the host cloud; and
determine whether a service within the target cloud is compatible with the service dependency.

10. The system of claim 9, wherein the processor to deploy the set of services in the target cloud in response to the target cloud being capable of supporting the set of services.

11. The system of claim 9, wherein the processor to:
generate a deployment recommendation for the set of services within the target cloud; and
provide the deployment recommendation to an administrator associated with the target cloud.

12. The system of claim 9, wherein the set of services comprises at least one of an identity management service, firewall service, security service, messaging service, data storage service, backup service, or file maintenance service.

13. The system of claim 9, the processor to:
determine that a first target cloud of the target cloud has a capacity to support at least one of the set of services;
determine that a second target cloud of the target cloud has a capacity to support a remainder of the set of services; and
determine whether the at least one of the set of services in the first target cloud and the remainder of the set of services in the second target cloud are compatible with the service dependency.

14. The system of claim 9, the processor to determine whether the target cloud comprises a capacity to deploy the set of services, wherein the capacity comprises a processing power required to support the set of services.

15. The system of claim 9, wherein to determine whether the target cloud comprises a capacity to deploy the set of services, wherein the capacity comprises a network bandwidth required to support the set of services.

16. The system of claim 9, wherein the processor to:
notify an administrator of the target cloud in response to the target cloud being capable of supporting the set of services.

17. A non-transitory computer readable storage medium that provides instructions, which when executed on a processor causes the processor to perform operations comprising:
detecting a set of services subscribed in a host cloud;
determining a service dependency within the set of services;
detecting, by the processor, a target cloud in the host cloud as a candidate in which to deploy the set of services in view of utilization of the set of services within the host cloud;
and
determining, by the processor, whether a service within the target cloud is compatible with the service dependency.

18. The non-transitory computer readable storage medium of claim 17, the operations further comprising deploying the set of services in the target cloud in response to the target cloud being capable of supporting the set of services.

19. The method of claim 1 further comprising deploying the set of services in the target cloud in view of the compatibility of the service within the target cloud with the service dependency.

20. The system of claim 9, the processor to deploy the set of services in the target cloud in view of the compatibility of the service within the target cloud with the service dependency.

* * * * *